(12) United States Patent
Blank

(10) Patent No.: US 7,720,050 B1
(45) Date of Patent: May 18, 2010

(54) METHOD AND APPARATUS FOR IMPLEMENTING AND MANAGING A NETWORK ARCHITECTURE

(75) Inventor: Jeffrey T. Blank, Frostburg, MD (US)

(73) Assignee: Conxx, Inc., Cumberland, MD (US)

( * ) Notice: Subject to any disclaimer, the term of this patent is extended or adjusted under 35 U.S.C. 154(b) by 1019 days.

(21) Appl. No.: 11/149,663

(22) Filed: Jun. 10, 2005

(51) Int. Cl.
    *H04L 12/66* (2006.01)
(52) U.S. Cl. .............. 370/352; 370/384; 370/401; 370/449; 370/473
(58) Field of Classification Search .......... 370/354, 370/392, 395.1, 395.2, 295.53, 395.6, 397, 370/467; 455/446, 524, 555; 700/83; 707/10; 709/245; 725/109
See application file for complete search history.

(56) References Cited

U.S. PATENT DOCUMENTS 6,434,562 B1 *  8/2002  Pennywitt et al. ............ 707/10
2004/0017816 A1 *  1/2004  Ishwar et al. ........... 370/395.53
2004/0090970 A1 *  5/2004  Sanchez et al. ............. 370/397
2004/0204778 A1 * 10/2004  Lalapeth et al. ............... 700/83
2005/0130701 A1 *  6/2005  Zendle ....................... 455/555

* cited by examiner

Primary Examiner—Pankaj Kumar
Assistant Examiner—Lonnie Sweet
(74) Attorney, Agent, or Firm—Colter Jennings

(57) ABSTRACT

A method and apparatus for implementing and managing a network architecture capable of delivering wireless telephony and data services of carrier class quality over a local or wide-area network using industry standard wireless protocols is disclosed. A high bandwidth microwave ring array provides redundant point-to-point communications between nodes that are located to optimize geographical coverage through radio-frequency wireless transceivers. The total system is managed and monitored through web-based software to provide the speed and reliability of wired systems at a fraction of the cost of traditional systems, facilitating service in rural areas or areas of dispersed populations where other communications infrastructure is impractical.

43 Claims, 12 Drawing Sheets

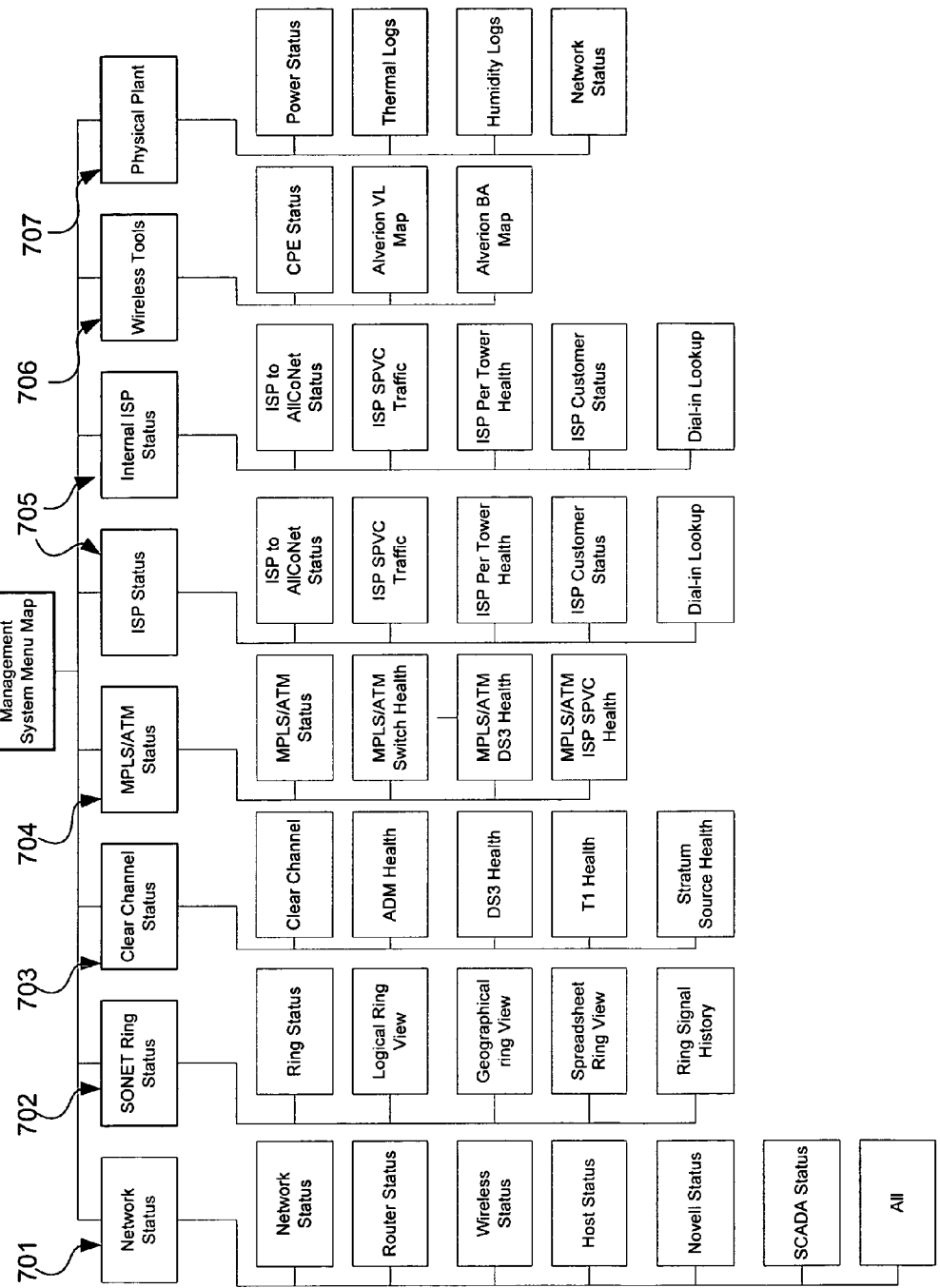

METHOD AND APPARATUS FOR IMPLEMENTING AND MANAGING A NETWORK ARCHITECTURE

BACKGROUND

This invention relates to telecommunications systems, and particularly to large bandwidth wireless telecommunications systems and services. Wireless communications services have traditionally lacked the bandwidth, speed and reliability of hard-wired systems based on electrical or optical transmission media. For this reason, the flexibility and cost advantages of wireless systems have not been fully realized in communications networks that require what are generally known as carrier grade standards.

Throughout the world, and particularly in large nations with significant populations of scattered rural or suburban communities, the high cost of implementing carrier grade standards through hard-wired networks typically creates a disparity in service commonly known as the digital divide. For example, the United States, with its large geographic areas and uneven population distribution, may be disadvantaged by this digital divide. Rural communities or small remote urban/suburban centers share the cultural, educational, and technical interests and capabilities of the major urban centers but are often too geographically dispersed to warrant (from an economic cost-benefit standpoint) the installation of communications systems (notably data communications) that meet the requirements for full participation in the digital world.

Existing hardwired telecommunications lines and switching systems often lack the capability to provide high bandwidth connectivity to scattered populations. In many areas, no major telecommunications provider is active and small local companies provide limited services. Cellular telephony lacks the consistency and reliability of a hard-wired system, and typically enables only a low bandwidth solution. At the same time, emerging wireless solutions used in data communications, including the 802.11b and 802.11g wireless standards, are limited in range and thus form small, disconnected islands of wireless capability. Traditionally, each such island of wireless connectivity had to be connected to others via hard-wired communication links.

SUMMARY

The present invention implements a range of technologies and techniques to implement carrier grade telephony and data communications over wide geographical areas using wireless systems. The present invention provides the redundancy and reliability required to achieve that standard using point-to-point microwave technology and GPS (global positional system) time synchronization, coupled with transceivers using standard wireless protocols, and a software-based management system to provide extremely high reliability. This configuration may be economically deployed in rural and urban areas alike creating an alternative to traditional wire-based telecommunications systems. The independent ability to power and control the wireless configuration provides a secure back up to current wired systems that could continue to function if natural or man-made calamities render the hard-wired systems unusable or insecure.

According to the present invention, a non-hardline or mixed non-hardline and hardline (including fiber, copper or other non-wireless means of connectivity) network infrastructure is provided that allows a comprehensive multi-user, multi-network and multi-service connectivity platform over a wide geographic area. The configuration of the network infrastructure components allows flexible coverage over contiguous or non-contiguous geographical areas by placement and orientation of the components comprising the system. The overall network system can be redundantly connected to existing wired and wireless backbone elements (including via satellite up and downlink) to insure uninterrupted service between multiple installations of the network and between installations of the network and other wired or wireless networks.

The backbone of the infrastructure provided in the present invention is a series of nodes that use combination of licensed point-to-point radio frequency communications in the microwave spectrum, free space optical (laser or equivalent carrying modulated optical frequencies in a manner equivalent to optical fiber), or hardline. If microwave transceivers are used, microwave transceivers or transponders are mounted on towers from which line-of-sight intercommunication is possible, each transponder comprising one node of the network. The permissible distance range between towers is limited only by line-of-sight requirements and the power and sensitivity of the transceivers coupled with antennas of sufficient gain. The towers may be formed into a topologically interconnected system, so that communications may be routed over alternative paths, providing continuous communications even in the event of a failure at one point in a ring. More complex topologies can provide greater redundancy.

The geographical location of the microwave towers, even in a ring configuration, is arbitrary and flexible. Each tower serves as a central location for a geographical subset of the overall network coverage area and may be placed in an optimum location to serve the desired area. The small footprint and relatively simple licensing procedures to establish a microwave substation allow great flexibility in the choice of location. This flexibility makes the infrastructure highly suited to hilly or uneven terrain where populations are scattered or where pockets of higher population may exist in valleys or lower elevations.

Each microwave node is connected to at least one add/drop multiplexer that is, in turn, configured to communicate with at least one switch capable of handling multiple communications protocols over Layer 2 as defined in the OSI networking model, providing traffic separation and prioritization. ATM (asynchronous transfer mode) or MPLS (multi-protocol label switching) protocols are typically used to provide the Layer 2 connectivity. The MPLS switches form a communications layer (MPLS layer) under the SONET backbone, providing the link between the nodes of the backbone and the transceivers that service users in the geographical coverage area of a specific node. Collectively, the MPLS layer forms a label switched hierarchy wherein the MPLS switches may be configured for connectivity including traffic prioritization, failover, and quality of service.

Using these standard protocols, each MPLS switch associated with a particular node provides one or more VPNs connecting end users in the geographical coverage area with the associated node in the overall network. The VPN switched paths may carry multiple discrete channels including communications related to internet service providers (ISP), metropolitan area networks (MAN), wide area networks (WAN), Public Safety Networks, or local area networks (LAN). Security protocols enable both public and private channels to be operated over shared VPNs or through individually controlled VPNs.

The MPLS switching layer is connected to the wireless access units. This switch accepts VLANS and QOS Tagging from the end user CPE to connect the various channels (such as an ISP) to end users at or near their associated nodes. End users within the range of these transceivers may implement computer, telephony or other components that link to the transceivers through equipment located on the end-users premises. Configurations and installations are similar to those well-known in the satellite television industry.

Multiple transceivers connected to the MPLS switch may be established on or near a microwave tower comprising one node of the system to provide broad coverage in the area surrounding that node. Multiple nodes may cover the same or overlapping geographical areas to provide redundancy and to ensure reliable reception and transmission in developed, forested, or uneven terrain where signal shadows might otherwise result in dead spots.

Once connected to the network through end-user equipment, multiple devices at the end-users premises may use the link for various purposes. A single home or office could access the internet through multiple computers, establish a virtual private network for secure communications, and replace or supplement existing telephone service with wireless telephony.

The usability and reliability of the overall network is dependent on a customized software system tailored to the network's specific configuration and allowing real-time monitoring and management of the system. Communications between the backbone layer and the external infrastructure, among the backbone nodes, between the SONET layer and MPLS layer, between the MPLS and the 802.3 layer, and between the access points associated with the 802.3 layer and the end users is monitored on a continuous basis.

The data communications capabilities native to the network provide the means to carry data about the hardware, software, signal quality, and in-progress communications to a central management console. A central database stores information automatically forwarded by components of the system. Using database and network standard protocols, such as the SQL database language and an SNMP (simple network management protocol) based system, information from the system may be translated into numerical or graphical that can be monitored by network management professionals. The management software may also employ triggers and alerts to provide pro-active warnings of system failures, defects, or development symptoms. The management console may be configured to automatically commence remedial procedures or send messages via email, fax, land-line telephony, cellular telephony, or radio to alert system managers.

Management utilities monitor critical elements of the total network system. These include signal strength, modulation levels, traffic patterns, and error rates. Physical parameters for which metering devices are included in various hardware components are also monitored, including temperature, humidity, airflow, power consumption, and physical intrusion or modification. Data communications are also monitored to verify that security measures are operating as expected and to detect any attempts at remote intrusion or improper use within the system.

BRIEF DESCRIPTION OF THE DRAWINGS

Other features and advantages of the present invention will be apparent from reference to a specific embodiment of the invention as presented in the following Detailed Description taken in conjunction with the accompanying Drawings, in which:

FIG. 7 depicts the menu tree structure of the management console;

DETAILED DESCRIPTION

According to the present invention, a combination of non-hardline and hardline network infrastructure is provided that facilitates carrier grade communications over a predetermined geographic area or set of areas. Each node may communicate with one or more other nodes in the network through a licensed microwave transceiver. One or more nodes in the network may also be connected to external network communications channels.

Figure 1:
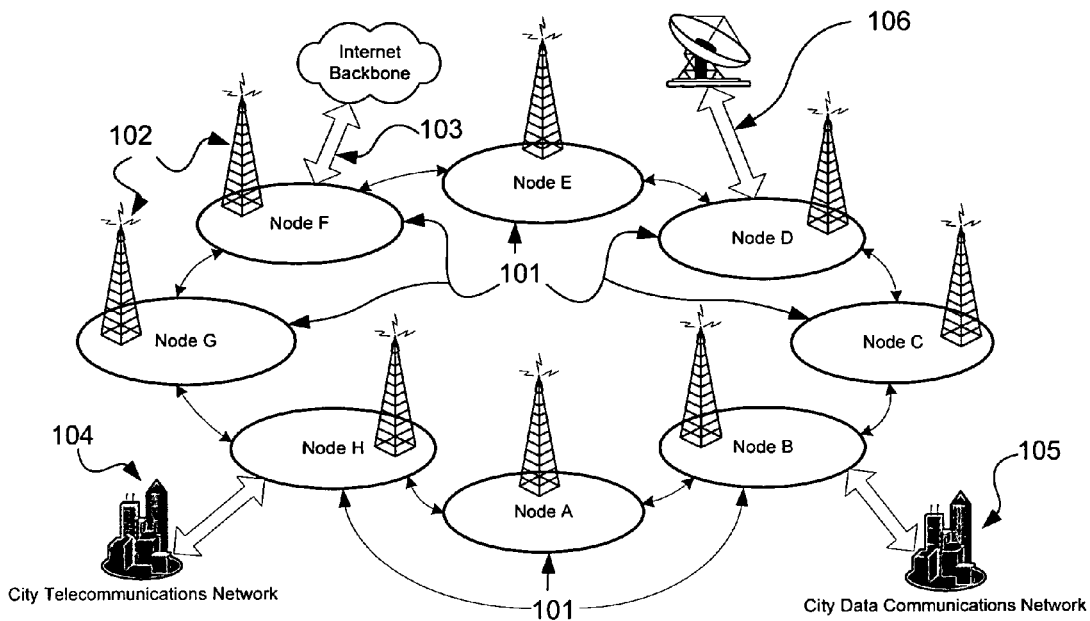
FIG. 1 depicts the microwave backbone in a ring configuration.

Ring and star configurations and their combinations are commonly used topologies for a network as they provide flexibility and redundancy. FIG. 1 depicts one embodiment of the present invention in which the backbone layer of the network is topologically configured as a ring. Each node 101 is bi-directionally connected to at least one other node by means of a microwave transceiver or other TDM carrier system. Microwave transceivers appropriate for this usage and capable of carrying the signals required typically operate in the 6 to 23 GHZ frequency range. Commercial equipment operating in the 6, 11, 18 and/or 23 GHZ frequency ranges is available and commonly used for this purpose. The ring topology shown in FIG. 1 describes a system of eight independent nodes, A through F, each connected to adjacent nodes in the ring. Because microwave transmissions are most reliable in line-of-sight configurations, the transceivers or their associated antennas are often mounted on radio towers 102 to facilitate unobstructed line-of-sight communications over the distances required for each node to cover the desired geographical area. Towers may be located on public or private land with appropriate permissions and require no extraordinary power requirements. Towers may be placed on points of higher elevations to facilitate line-of-sight communication between towers, while each tower services the area from which the tower is visible, such as a valley that the tower overlooks. Buildings in urban areas may provide similar points of optimum coverage in those environments.

The embodiment of the invention depicted in FIG. 1 uses a ring topology for the nodes to provide some degree of redundancy. Because the communication between the nodes is bidirectional, a single break in a communications link between any two nodes generally does not affect the ability of the network to handle information flow to and from any node as the signal could be routed to the interrupted node from the opposite direction.

Other embodiments of the invention may use different topologies to accommodate specific geographical, cost, or reliability requirements. A star configuration or a combination of ring and start configurations are equally feasible. By adding additional transceivers and antennas, any node may communicate with more than two additional nodes, creating additional redundancy without any practical limit.

The backbone of the network facilitates communication among end-users and devices served by each node on the backbone. The backbone may also be connected to additional networks, including the Internet, through wireless or hardwired links to external networks connected by one or more nodes of the network backbone. As depicted in FIG. 1, these may include a connection to the Internet backbone 103, a telecommunications network in a nearby urban center 104, a data communications network in a nearby urban center 105, and a satellite up/down-link 106. Because such external sources are also redundantly connected to other network facilities, reliable connections with the Internet, private networks, wired and wireless telecommunications providers and other data or telephony communications systems may be implemented.

Figure 2:
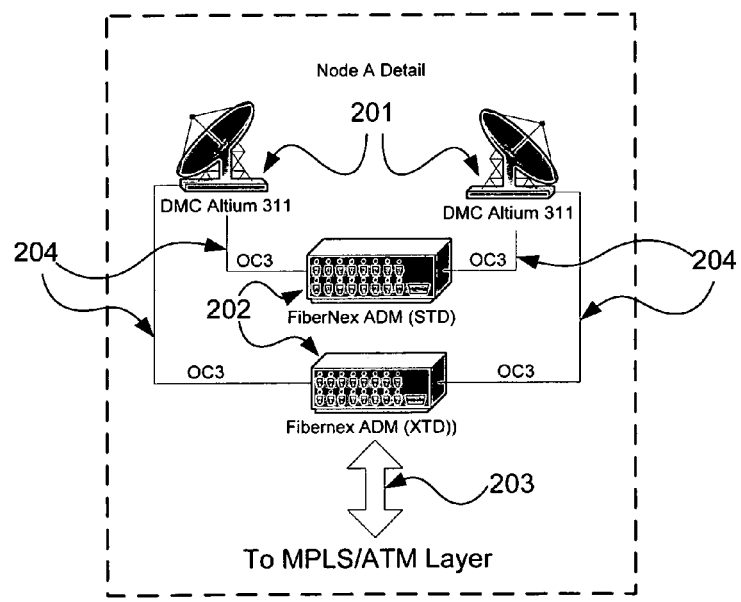
FIG. 2 depicts one node of the microwave backbone.

FIG. 2 depicts a single node of the backbone layer according to one embodiment of the present invention. Each node comprises at least one microwave transceiver. A ring topology or other redundantly connected system will have two or more transceivers. The embodiment shown in FIG. 2 depicts two microwave transceivers 201. These may be generally available microwave radio devices including, by way of example, the Altium 311 used in cellular network systems and operating on the 11, 18, or 23 MHZ microwave bands or multiple combinations of such bands. This specific transceiver supports data transport at rates of up to 622 Mbs (megabits per second) over distances of up to eleven miles and implements efficient 128 QAM and 256 QAM modulation levels, as known in the art, at times achieving a 99.999% reliability factor and an error rate of less than $10^{-13}$, thus providing carrier grade reliability. Low cost equipment that is readily available easily accommodates a distance of up to 17.7 kilometers (11 miles) between towers.

One embodiment of the present invention uses SONET network protocols. While designed for optical networks, the use of SONET enabled equipment allows other hardware and software designed for use in fiber-based networks to be used transparently in conjunction with the invention's wireless capabilities. The choice of SONET for the network backbone allows the network to take advantage of SONET's exceptionally fast ring reversal, on the order of 25 milliseconds, in the event of a link failure. SONET also offers the availability of TDM handoffs at each node. The present invention may utilize ATM or MPLS LSR switching to implement Layer 2 as defined in the OSI standard networking model. MPLS (multi-protocol label switching) using an LSR (label switching router) provides optimum flexibility. While MPLS allows route rebuilding, considerable time is required to re-establish full connectivity.

Standard add/drop multiplexers (ADMs) based on SONET protocols are deployed at each node of the backbone. These ADMs are identical to those used on fiber-based networks. FIG. 2 depicts a node of the backbone deploying two ADMs 202 one of which is dedicated to the routing of communications passing through the node and the second of which is dedicated to routing communications between that node and its associated MPLS enabled layer. The ADMs link to the microwave transceivers using multiples of the Optical Carrier 3 standard which is equivalent to a 155.52 Mbs leased line.

Implementing the ADMs on the microwave backbone, which comprises the physical layer of the network, rather than at the MPLS enabled layer, confers specific advantages. It allows deployment of traditional point-to-point TDM (time division multiplexing) services, such as T1-T3 dedicated data lines, on the physical layer by installing additional tributary cards to the ADMs. This allows such dedicated services to be handled transparently and without adding additional loading to the MPLS enabled layer that must handle the routing of traffic to and from the associated node. Removing these circuits and functions from the MPLS enabled layer also simplifies telecommunications and PBX switch interconnects with the system by handing off point to point circuits using traditional TDM signaling.

According to one embodiment of the present invention, the backbone of the infrastructure is a series of nodes that use licensed point-to-point radio frequency communications in the microwave spectrum. Commercial equipment operating in the 6-23 GHZ frequency range is used for this purpose. Microwave transceivers or transponders are mounted on towers from which line-of-sight intercommunication is possible, each transponder comprising one node of the network. The permissible distance range between towers is typically limited only by line-of-sight requirements and the power and sensitivity of the transceivers coupled with antennas of sufficient gain. Low cost equipment that is readily available currently accommodates distances of up to approximately 17.7 kilometers (11 miles) between towers. The towers are used to form a topologically interconnected system, ring and star configurations and their combinations being the most common, so that communications may be routed over alternative paths, providing continuous communications even in the event of a failure at one point in a ring. More complex topologies can provide greater redundancy.

Figure 3:
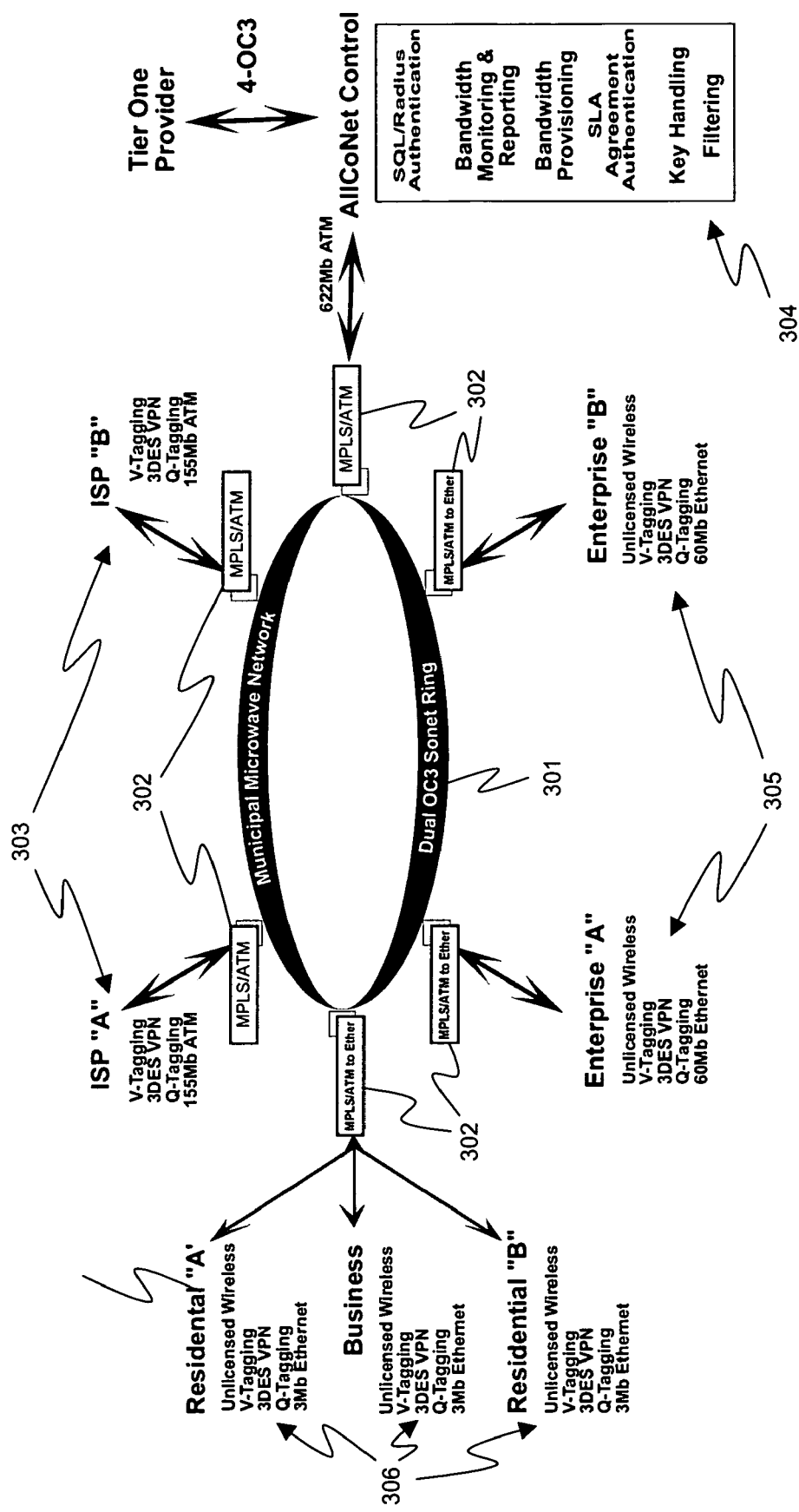
FIG. 3 depicts a hypothetical network configuration in schematic format.

FIG. 3. depicts a hypothetical network configuration schematically, in which the backbone comprises a dual OC3 SONET ring 301. Six nodes 302 on the backbone ring topology connect the MPLS layer with multiple Internet Service Providers 303, the network central control and monitoring system 304, and via multiple wireless Ethernet to business enterprises 305, and multiple small business or residential users 306 through a single wireless Ethernet link 306.

Figure 4:
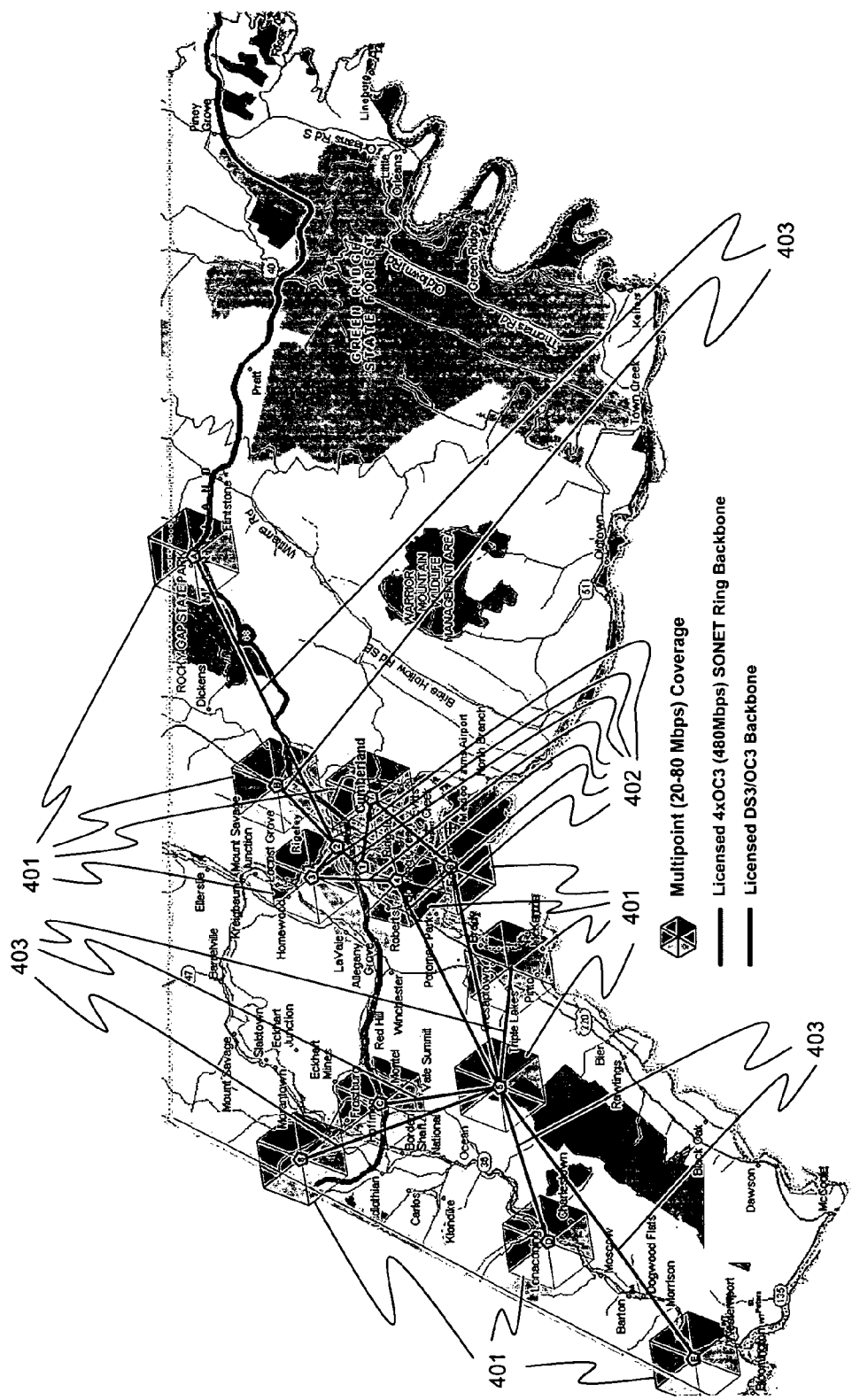
FIG. 4 depicts a hypothetical network configuration in a geographic setting.

FIG. 4. depicts a hypothetical network configuration geographically, demonstrating the coverage of business and residential centers in a rural area. The towers 401 shown are located within or near population or business centers and consist of multi-directional transceivers to provide 360 degree coverage. The backbone shown is a combination ring and star topology comprising both licensed 4×OC3 SONET ring links 402 and licensed DS3/OC3 links 403 as are known in the art. The higher capacity 4×OC3 SONET ring portion of the network forms a ring topology and services those centers requiring higher traffic loads.

The geographical location of the microwave towers, even in a ring configuration, is arbitrary and flexible. Each tower serves as a central location for a geographical subset of the overall network coverage area and may be placed in an optimum location to serve the desired area. The small footprint and relatively simple licensing procedures to establish a microwave substation allow great flexibility in the choice of location. Towers may be located on public or private land with appropriate permissions and require no extraordinary power requirements. This flexibility makes the infrastructure highly suited to hilly or uneven terrain where populations are scattered or where pockets of higher population may exist in valleys or lower elevations. Towers may be placed on points of higher elevation to facilitate line-of-sight communication between towers, while each tower services the area from which the tower is visible, such as a valley that the tower overlooks. Buildings in urban areas may provide similar points of optimum coverage in those environments.

Each microwave node is connected to at least one add/drop multiplexer that is, in turn, configured to communicate with at least one MPLS switch capable of handling multiple communications protocols. Although not necessarily optical in character, the add/drop multiplexers may be based on SONET (synchronous optical networking) technology, which is an industry standard for such communication nodes. The MPLS switches form a communications layer (MPLS layer providing Layer 2 service defined in the OSI networking model as known in the art) under the SONET backbone, providing the link between the nodes of the backbone and the transceivers that service users in the geographical coverage area of a specific node. Collectively, the MPLS layer forms a switched circuit hierarchy wherein the MPLS switches may be configured for connectivity including traffic prioritization, failover, and quality of service.

Using these standard protocols, each MPLS switch associated with a particular node provides one or more virtual private networks (VPNs) connecting end users in the geographical coverage area with the associated node in the overall network. The VPNs may carry multiple discrete channels including communications related to internet service providers (ISP), metropolitan area networks (MAN), wide area networks (WAN), Public Safety Networks, or local area networks (LAN). Security protocols enable both public and private channels to be operated over shared VPNs or through individually controlled VPNs.

The MPLS switching layer uses standard protocols to connect the various channels (such as an ISP) to end users via unlicensed wireless access points located at or near their associated nodes. Standard wireless Ethernet transceivers, or TDMA (time division multiple access) systems commonly used in certain cellular telephony networks may be used for this purpose. End users within the range of these transceivers may implement computer, telephony or other components that link to the transceivers through equipment located on the end-users' premises. The end-user premises equipment may include inexpensive standard wireless devices coupled with high gain directional antennas that are oriented toward one or more nodes that cover their geographical area. Configurations and installations are similar to those well-known in the satellite television industry. More expensive equipment may be required for higher bandwidth installations but would be readily accessible to small—even home-based—businesses, schools, libraries, public service bodies and the like as necessary to carry the required data loads.

Figure 6:
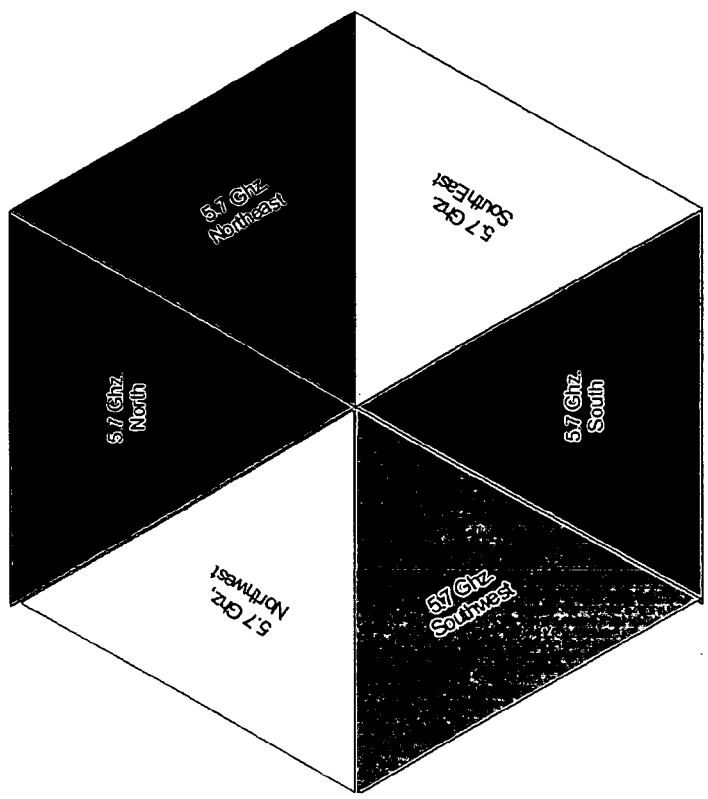
FIG. 6 depicts a 360 degree coverage configuration using six transceivers at 60 degree angular spacing.
Figure 5:
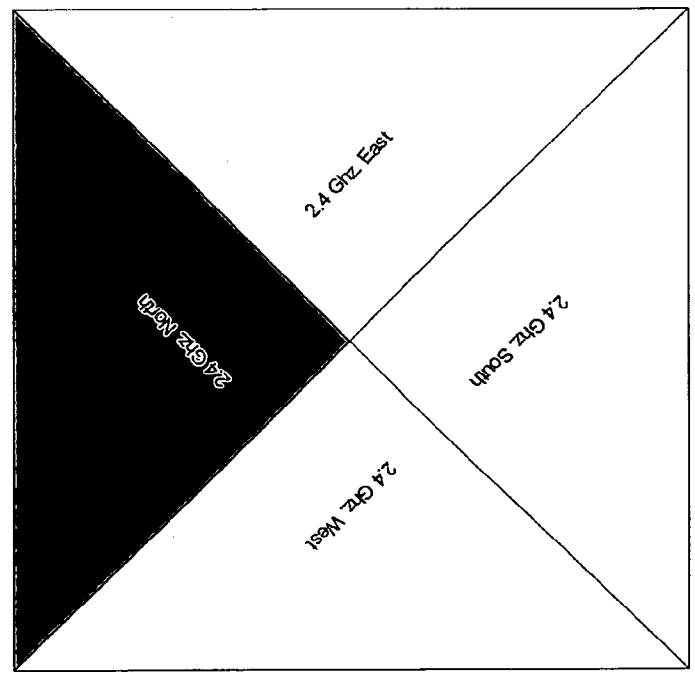
FIG. 5 depicts a 360 degree coverage configuration using four transceivers oriented at cardinal compass points.

Multiple transceivers connected to the MPLS Bridge may be established on or near a microwave tower comprising one node of the system to provide broad coverage in the area surrounding that node. A configuration requiring 360 degree coverage might have four transceivers oriented at cardinal compass points as depicted in FIG. 5, or six transceivers at 60 degree angular spacing to ensure adequate coverage with a desired overlap to ensure reliability as depicted in FIG. 6. Using currently available transceivers operating on the 2.4 or 5.7 GHz bands (the higher frequencies offering greater bandwidth), coverage of six to seven miles surrounding a given node is feasible. Multiple nodes may cover the same or overlapping geographical areas to provide redundancy and to ensure reliable reception and transmission in developed, forested, or uneven terrain where signal shadows might otherwise result in areas of no reception or unreliable reception.

Once connected to the network through end-user equipment, multiple devices at the end-users' premises may use the link for various purposes. A single home or office could access the Internet through multiple computers, establish a virtual private network for secure communications, and replace or supplement existing telephone service with wireless telephony.

According to one embodiment of the invention, the usability and reliability of the overall network is dependent on a customized software system tailored to the network's specific configuration and allowing real-time monitoring and management of the system. Communications between the backbone layer and the external infrastructure, among the backbone nodes, between the SONET layer and the 802.3 layer, and between the access points associated with the 802.3 layer and the end users is monitored on a continuous basis.

According to the present invention, the data communications capabilities native to the network provide the means to carry data about the hardware, software, signal quality, and in-progress communications to a central management console. A central database stores information automatically forwarded by components of the system. Using database and network standard protocols, such as the SQL database language and an SNMP (simple network management protocol) based system, information from the system may be translated into numerical or graphical outputs that can be monitored by network management professionals. The management software may also employ triggers and alerts to provide proactive warnings of system failures, defects, or development symptoms. The management console may be configured to automatically commence remedial procedures or send messages via email, fax, land-line telephony, cellular telephony, or radio to alert system managers.

FIG. 7 depicts a menu map of a comprehensive management system the sub-menu items that facilitate independent or simultaneous monitoring of Network Status 701, SONET Ring Status 702, Clear Channel Status 703, MPLS/ATM Status 704, ISP Status 705, Wireless Tools 706, and Physical Plant 707. Each sub-menu drives specific monitoring functions that depict the status and health of the various parameters relevant to each of the identified network components 701 through 707 providing text, numerical, tabular and graphical representations of the data.

Figure 8:
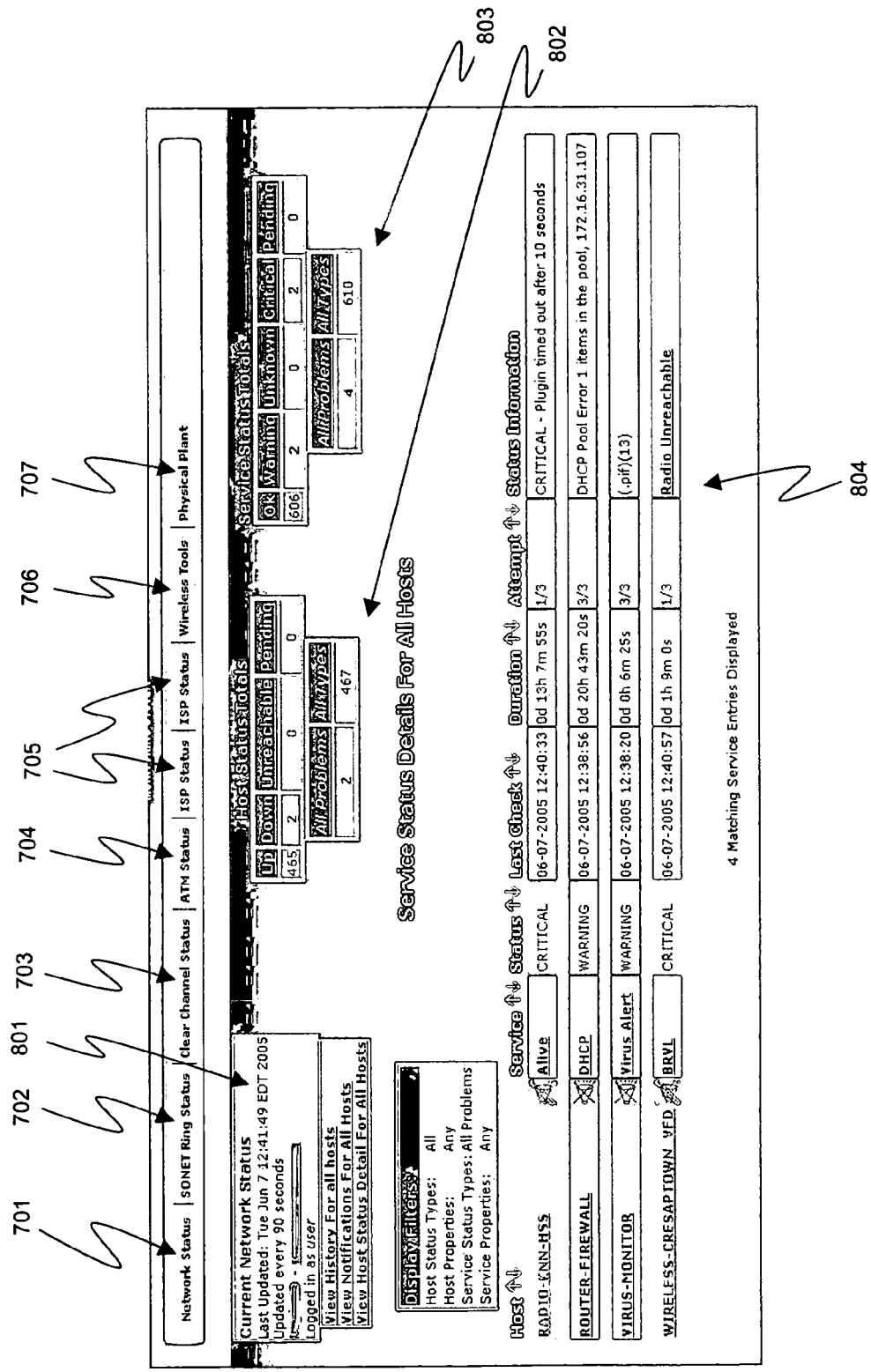
FIG. 8 depicts the master menu screen of the management console.

FIG. 8 depicts a browser-based text and graphical representation of the top-level menu from which the network components 701 through 707 may be selected graphically using a computer mouse. Critical information confirming the current status and health of the overall network is displayed on the top-level menu screen, which may include Current Network Status 801, Host Status Totals 802, Service Status Totals 803, and critical problems or warnings 804 that require immediate attention.

Management utilities monitor elements of the total network system. These include signal strength, modulation levels, traffic patterns, and error rates. Physical parameters for which metering devices are included in various hardware components are also monitored, including temperature, humidity, airflow, power consumption, and physical intrusion or modification. Data communications may also be monitored to verify that security measures are operating as expected and to detect any attempts at remote intrusion or improper use within the system.

One key to achieving carrier-grade reliability and quality of service is continuous monitoring of operational aspects of the total system. In the described embodiment of the invention, monitoring occurs every 90 seconds, pulling required statistics from the equipment comprising the backbone, 802.3 layer, and unlicensed radio systems, physical node security, and environmental systems. These statistics are validated by the software management utilities, and alarms are activated if monitored values are outside the defined rule-set. Furthermore, statistics and some values are stored in a back-end database for historical data review, comparisons, and trend analysis. Various parameters are collected and stored in a round-robin database (RRD). As is known in the art, the RRD is a system to store and display time-series data such as network bandwidth, machine-room temperature, and server loading. The RRD stores the data in a very compact way that does not expand over time, and it is optimally suited to the creation of graphical displays. The parameters stored in the RRD are used to generate short and long term graphs that indicate the current status and health of the various systems that are monitored. The monitored parameters relating to the wireless transmissions in the current embodiment include signal strength, traffic, modulation level, and error-rate.

Figure 9:
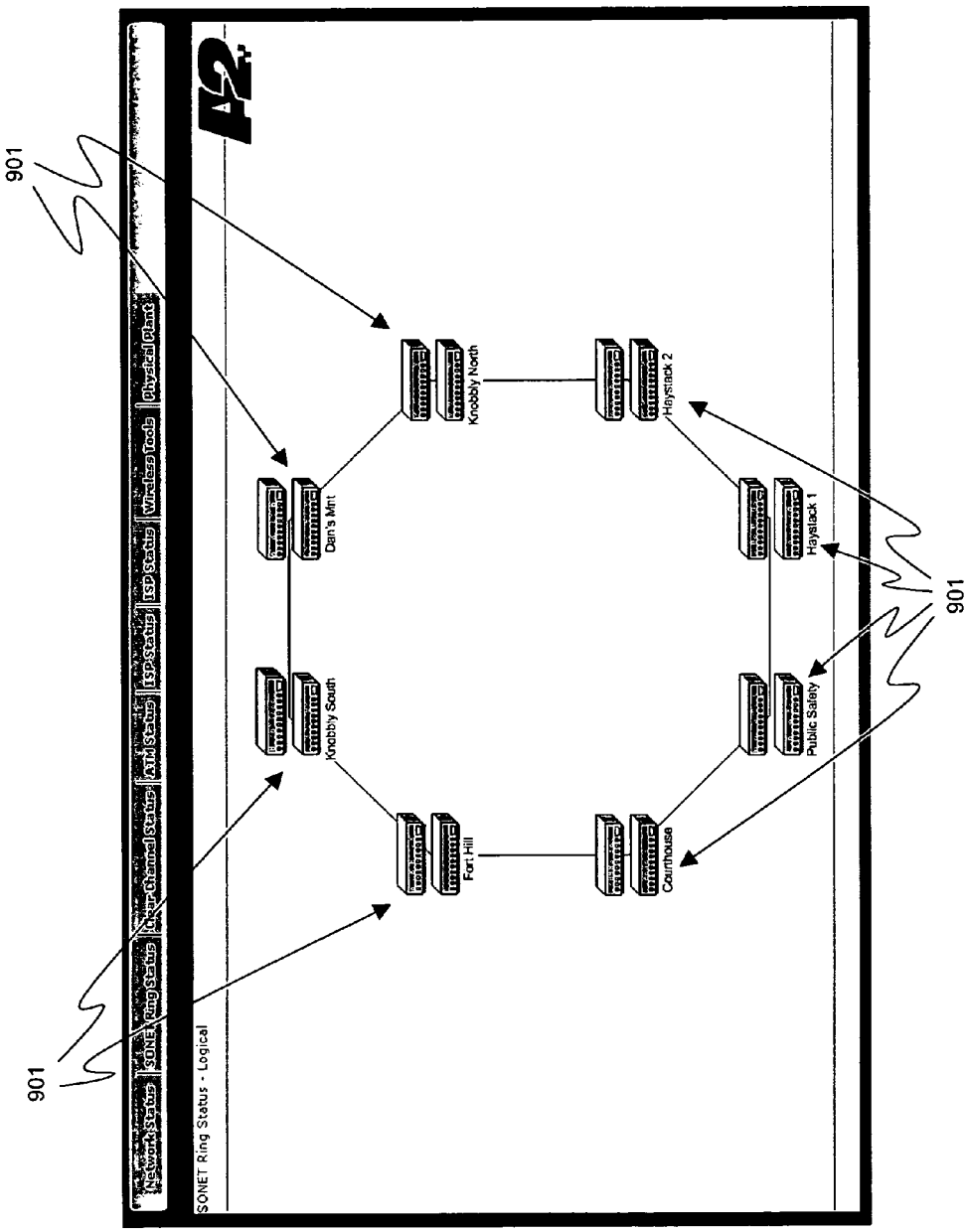
FIG. 9 depicts a logical view of the network backbone from the management console.
Figure 10:
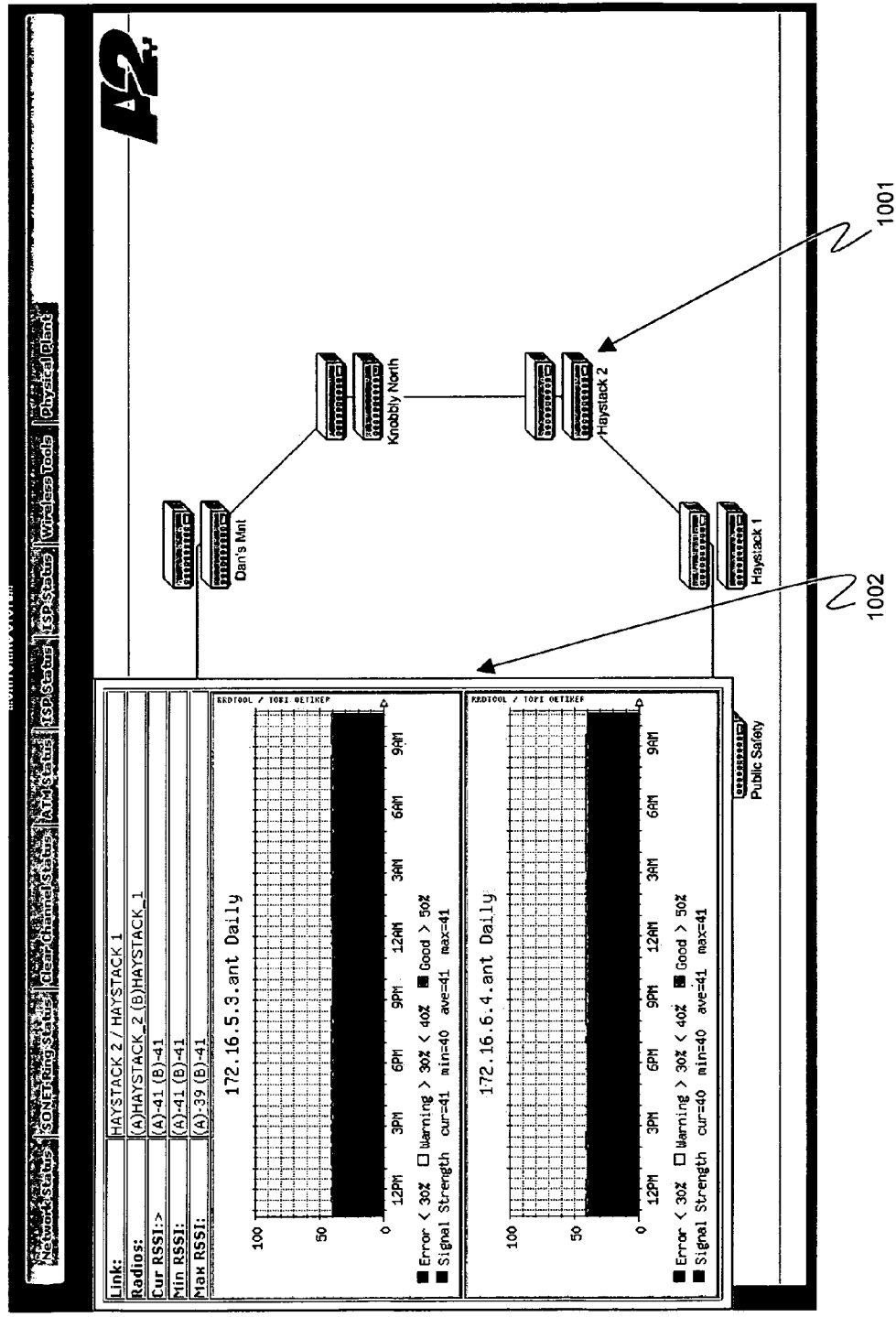
FIG. 10 depicts a logical view of the network backbone from the management console with an information window open.

FIG. 9 depicts one mode of representing and accessing information relating to the status and health of the network. In FIG. 9 the nodes of the SONET Ring backbone 901 are depicted logically, without regard to actual geographical location, and may be identified by names or numerical designations. By hovering a computer mouse pointer over any one of the nodes, text, numerical, tabular, and graphical data may be presented on the screen in a window facilitating fast access to details concerning the operational characteristics of any given node. FIG. 10. depicts the same logical view of the SONET Ring Backbone shown in FIG. 9 in which the mouse pointer has been hovered over a specific node 1001. The act of hovering the mouse opens a new window 1002 providing current and historical data concerning the operation of that node in text and graphical format. Color coding may be used in the graphical representations to flag, for example, normal operation in green, warning conditions in yellow, and error conditions in red.

Figure 11:
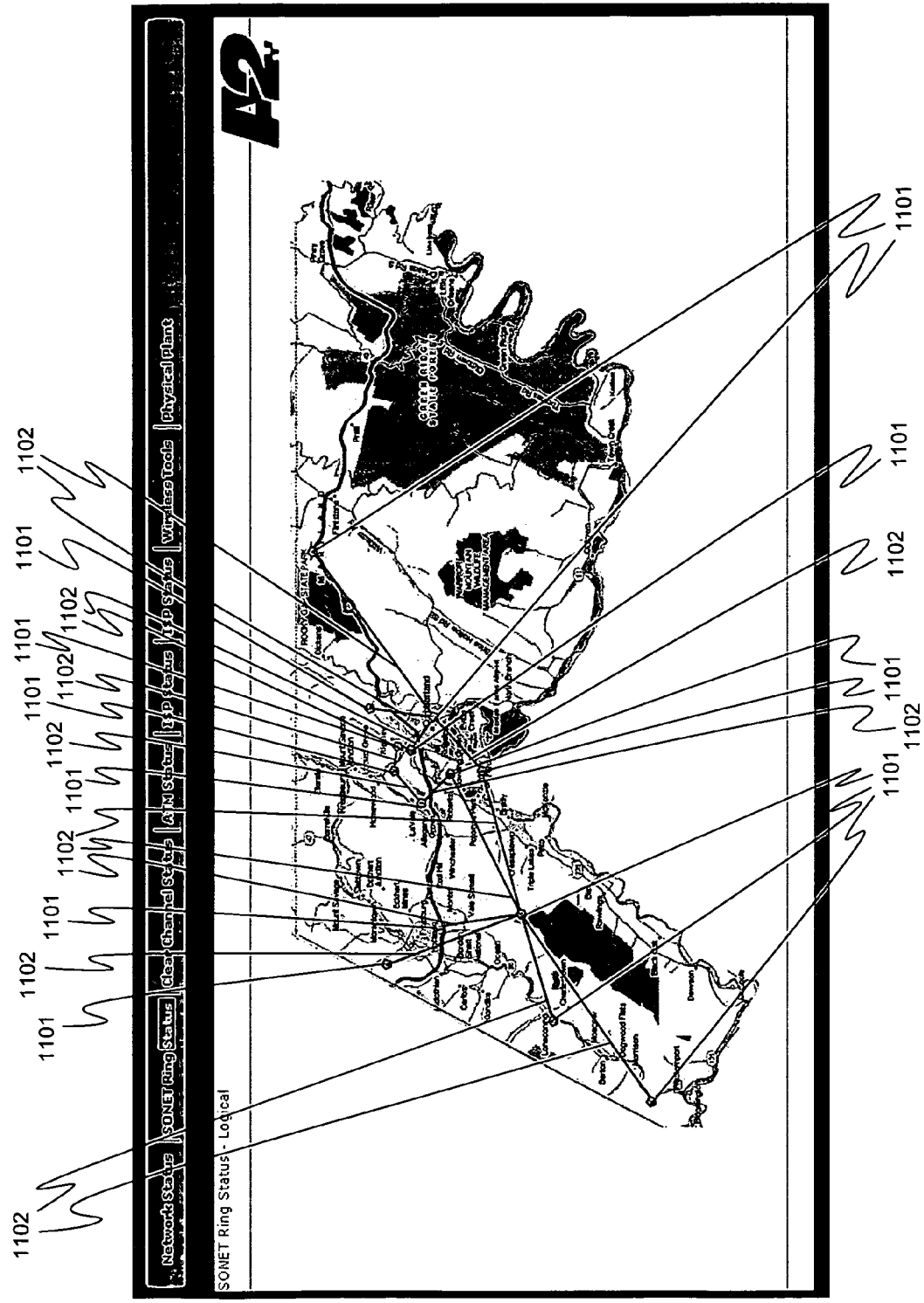
FIG. 11 depicts a geographic view of the network backbone from the management console.
Figure 12:
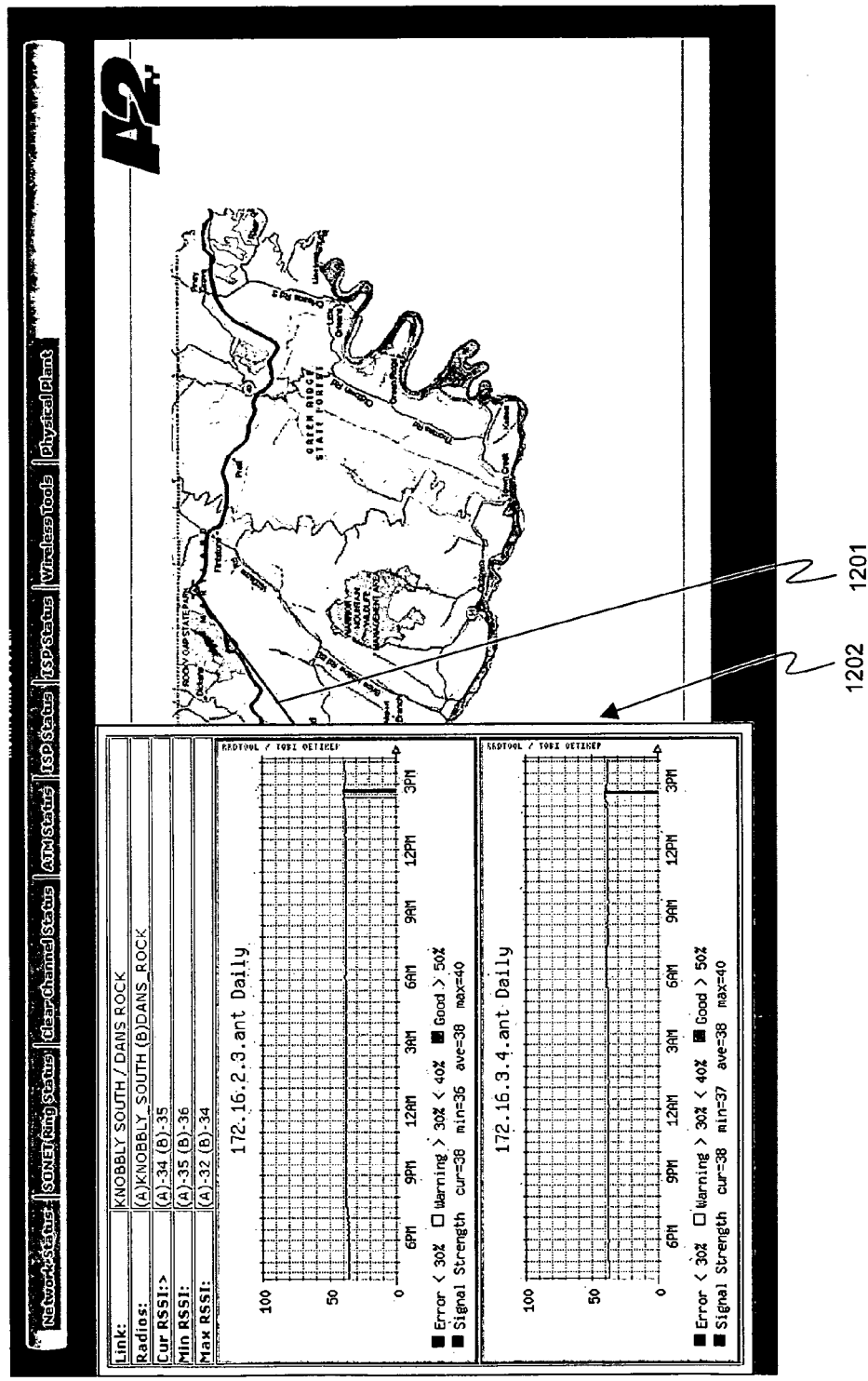
FIG. 12 depicts geographic view of the network backbone from the management console with an information window.

FIG. 11 depicts a different mode of representing and accessing information relating to the status and health of the network. In FIG. 11 the nodes of the SONET Ring backbone 1101 are depicted graphically on a map of the physical area covered by the network while links between the nodes are depicted by lines 1102. Nodes may be readily identified by the actual place names of towns or physical features with which they are associated. By hovering a computer mouse pointer over a node or a link, text, numerical, tabular, and graphical data may be presented on the screen in a window facilitating fast access to details concerning the operational characteristics of any given node. FIG. 12. depicts the same geographical view of the SONET Ring Backbone shown in FIG. 11 in which the mouse pointer has been hovered over a specific link 1201. The act of hovering the mouse opens a new window 1202 providing current and historical data concerning the operation of that link in text and graphical format. Color coding may be used in the graphical representations to flag, for example, normal operation in green, warning conditions in yellow, and error conditions in red.

Figure 13:
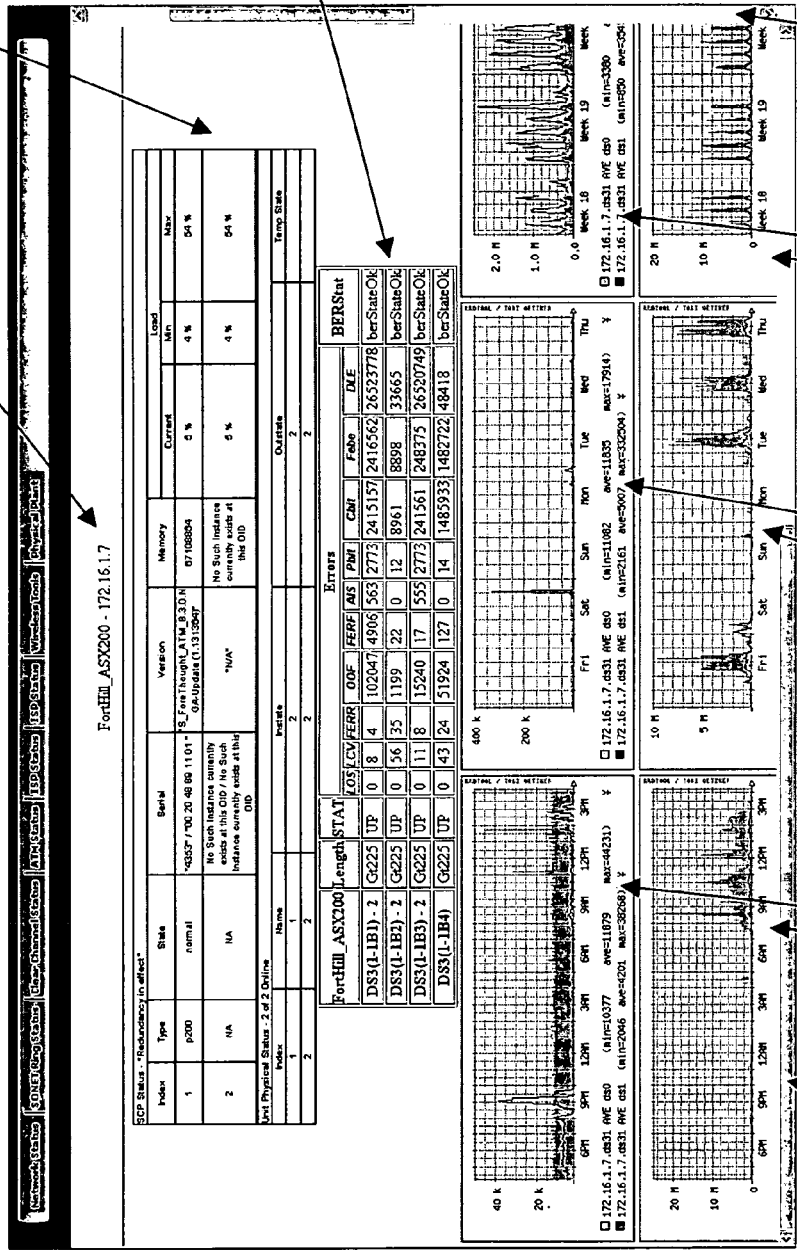
FIG. 13 depicts a tabular and graphic information display from the management console.

FIG. 13 depicts a more detailed text and graphical presentation of data useful in monitoring individual components of the network. In FIG. 9 a specific MPLS/ATM switch, comprising hardware and operating software, is selected by name or IP address 1301. Current information relating to the identify and general characteristics of the switch is presented in tabular format 1302 while current operating status, including errors, is presented in tabular format 1303. Multiple graphs 1304 providing historical operating information over time are depicted graphically 1304. Because an individual component of the network may require monitoring of more parameters than conveniently fit on a single computer screen, a windowing system with vertical and horizontal sliders 1305 may be used to provide scrolling access to all related graphical representations on a single logical screen.

The signal strength value is stored in a stand-alone RRD for future trend analysis. This tracks the short and long term signal strength of the wireless access device to predetermine link quality issues and possible failures. This is one way to predict failure and allow for proactive remedial action to be taken.

The traffic values are stored in a separate stand-alone RRD for future trend analysis. This parameter tracks the short and long term traffic patterns in each wireless link. These traffic patterns measure loads over time and are used to predict the need for a link upgrade or a service upgrade. Changes in traffic patterns may also indicate possible unwanted or illegal traffic activity that can be intercepted and analyzed to identify the source of the improper traffic.

The Modulation Level value is stored in a stand-alone RRD for future trend analysis. As noted above, signal strength is one factor in determining wireless link quality. Modulation level is also important because the readability and reliability of even a strong signal is diminished if the modulation level does not take advantage of the full signal strength. Modulation levels, tracked over the short and long periods, are used to determine signal interference patterns. While signal strength only indicates how much signal is received, modulation level provides usable information as to the quality and authenticity of that received signal.

Data errors are inevitable in any system and data transfer protocols include verification and redundancy mechanisms to automatically correct such errors by using corrective algorithms and/or retransmitting blocks of data that contain errors. The measurement of error rates associated with specific frequencies, specific system-wide equipment, or specific customer equipment provides information that may be used to optimize the system, improve quality of service, and anticipate equipment failures or required maintenance.

Recurring errors or increasing error rates associated with specific frequencies may indicate adjacent frequency or co-channel interference and the need for adjustment of transceiver equipment, system repairs, upgrades or other corrective actions. For this reason, the error count per frequency is stored in a stand-alone RRD for future trend analysis. Per-frequency error rates are tracked over short and long periods to determine if there is any co-channel interference occurring in the used spectrum.

Per-hop error rates are also measured to determine if error sources are attributable to equipment problems or external interference associated with a specific link in the network topology. To insure that each network customer maintains carrier grade quality of service and reliability, the error count per customer premises equipment (CPE) is stored in a stand-alone RRD for future trend analysis. Per CPE hop statistics are used to determine the source of unwanted spectrum interference. By mapping the location of the CPE devices and the frequencies being interfered with, an operator can identify the location of interfering devices.

Physical equipment parameters are monitored to ensure reliability and to predict required maintenance and incipient failures, allowing corrective action to be taken without interrupting network service. This aspect of network design and monitoring minimizes the need to dispatch personnel to remote physical locations to inspect and test equipment. Instead, remote environment sensors are located at each local and remote facility. These facilities are mostly unmanned so historical data is maintained at the central database, accessible through a software management console to ensure proper operating conditions are maintained. As with the wireless transmission information, various parameters inherent in the physical system are collected from sensors in the equipment and stored in an RRD.

Built in sensors for key operating parameters are standard in most network equipment. Aftermarket sensors may be added where necessary. These parameters are then used to generate short-term and long-term graphs that indicate link health. Independent RRDs store values for temperature, airflow, humidity, power utilization, generator run time and direct current (DC) utilization. Data from the RRD may be viewed in graphical or numerical format to spot trends and identify causes of abnormal readings.

Figure 14:
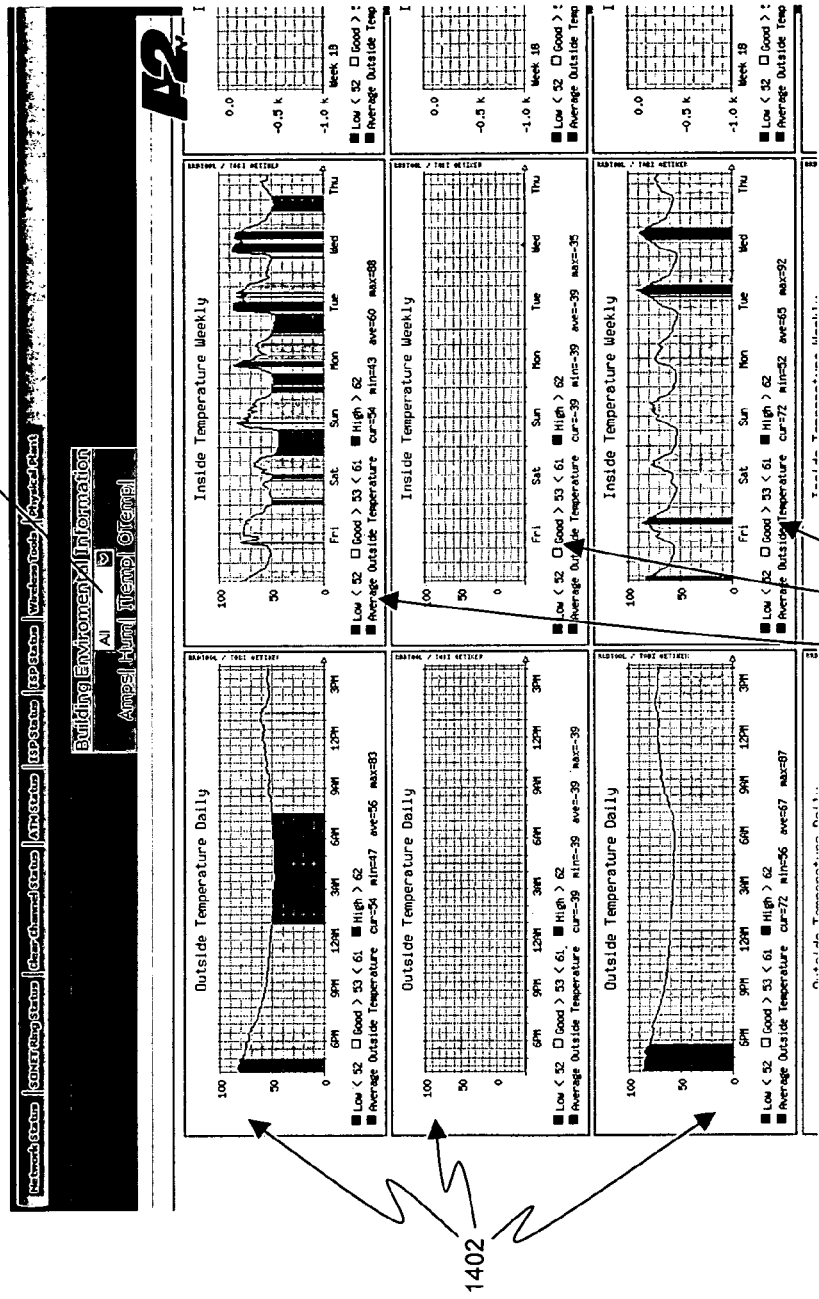
FIG. 14 depicts a tabular and graphic information display of physical facility status from the management console

FIG. 14 depicts a graphical method of monitoring physical parameters of the network equipment. One, multiple or all facilities may be selected for viewing by a menu selection 1401. Historical data showing outside temperature over time 1402 or inside temperature over time 1403 may be shown for one or more facilities allowing comparison as well as viewing of individual data elements. To show additional physical parameters, such as humidity, power consumption, airflow, and access a windowing system with vertical and horizontal sliders may be used to provide scrolling access to all related graphical representations on a single logical screen.

Security of identity and data are key elements to a carrier grade network. The wireless monitoring described above, in one embodiment of the invention occurring every 90 seconds, includes the measurement of parameters that enhance network security. As with other wireless functions, statistics that relate to security are validated, and alarms are activated if monitored values are outside a defined rule-set. Furthermore, certain key values related to security are stored in a back-end database for historical analysis.

The most effective attack against a wireless network, known as a layer 2 attack, is well known in the art and operates on the vulnerabilities of switched local area networks, particularly those that use Ethernet as the layer 2 protocol. In wireless Ethernet configurations, this type of security attack is generally accompanied by modification of the physical radio unit. To assure that improperly modified equipment is not present on the network, various parameters are gathered and compared to a backend database that defines the network as originally configured. The parameters monitored to detect changes that threaten network security are network configuration values, system firmware, geo-coding modules, frequency coordination modules, and phantom MAC addressing.

Configuration values of the layer 2 protocol, Ethernet in the described embodiment, include VLAN ID, trap receiver, current AU (Access Unit), Ethernet mode, and other standard Ethernet configuration values known in the art. These are checked against a pre-defined rule-set. The defined rule-set assures validity and correctness on the network. A variance in these parameters can lead to the discovery on an invalid or modified network device.

Firmware systems, comprising embedded software on physical elements of the network, are designed to be externally modified to accommodate changes in configuration, upgrades, and bug fixes. Operating and backup firmware versions are monitored to assure against deviant code versions. Sophisticated network attacks may be launched through a CPE code modification, where the operating system in the CPE has been modified to report incorrect or misleading data that would cause the validity or correctness to be reported incorrectly. The firmware-monitoring module reads the current and backup code signatures to ensure security is maintained. Unauthorized changes may be detected within minutes, activating alarms and providing for automated intervention (such as denying access to the unauthorized device) or human intervention.

Each element of the network may be associated with a precise physical location or geo-code. This location may be monitored precisely via GPS satellite tracking. Multipoint Transceiver latitude and longitude values are pulled from the GPS equipped units and stored in the back-end database. The Multipoint Transceiver's associated CPE units are also stored in the back-end database. These values are retrieved upon request and plotted on a topographical map to display estimated coverage area and CPE associations. When valid or invalid CPE data is retrieved the CPE can be triangulated based on its best AU scores. This method of triangulation uses the known latitude and longitude of the AUs and a point-scoring system of known good AUs to determine the distance of each detected AU. With this information an approximate location of a CPE can be determined and spurious units detected and remedied.

The frequency coordination module can also detect spurious equipment or interference on the network. Multipoint transceiver frequencies are stored in the geo-coding module to display patterns that may indicate frequency collisions. As described above with respect to the per-CPE hop statistics, the frequency coordination module is used to determine the source of unwanted spectrum interference. By mapping the location of the CPE devices and the frequencies being interfered with an operator can identify the location of interfering devices.

Security depends heavily on knowing the identity of network users at any given time. Phantom MACs (Media Access Control Address), as are known in the art, may be created and monitored to detect spurious users. In a wireless environment, authentication using normal protocols is insufficient. If an unauthorized user breaks the authentication algorithm and obtains access on the network, the phantom MAC allows identification of the radio association and alerts the operator to an unauthorized network access. This layer 2 security violation is very difficult to detect through traditional detection means that operate on a layer 3 protocol, such as IP (Internet Protocol). A phantom MAC approach acquires the associated CPE MAC and authenticates it against the authentication database. CPE that doesn't meet authentication rule-sets is triangulated and disabled, either automatically or manually. This can be done by "mapping" the MAC out of the networks ARP tables thereby disabling access to the network.

Monitoring the MPLS enabled layer also ensures that network security is not compromised at that layer. Often, the most effective attack against an MPLS enabled network is a layer 2 attack accompanied by modification of the MPLS enabled unit. To insure that modified equipment is not present on the network various parameters are gathered and compared to a backend database. The parameters related to MPLS enabled layer monitoring are OS revision control, and control processor redundancy. Other parameters monitored are RFC 1483 bridge, DS3 feed monitoring, traffic monitoring, and LOS LCV FERR OOF FERF AIS P-Bit C-Bit FEBE DLE.

Operating and backup OS versions of equipment operating at the MPLS enabled layer are monitored to assure against corrupt code versions. MPLS enabled switches hold primary and secondary code revisions. Code revisions typically have security upgrades built into them. One method of attacking a network is to corrupt a primary code revision, forcing the unit to revert to an older (and more vulnerable) version. OS revision control tracks the currently running code to assure against this attack.

Primary and secondary control processors are monitored to assure reliability by checking for redundancy. During a failure or attack, control processor(s) are often forced into a faulted state, known as a buffer overflow. When this happens, one of the control processors is forced offline. The Control processor redundancy check verifies both control processors are online and functioning properly.

RFC 1483 describes encapsulation for carrying network interconnect traffic over MPLS enabled networks. DS3 high-bandwidth feeds are monitored to assure load-balancing and Bit-Error Rate (BER). One of the strengths of this model is feeding each network node with multiple clear channels. Because these clear channel circuits have no monitoring equipment on them, the MPLS enabled layer can be used to extract performance data about the DS3s to determine DS3 quality and send alerts if load balancing is not happening properly. This assures that proper TDM load balancing is occurring as well as that a tower is not approaching a "loaded" state.

Traffic between the RFC 1483 Bridge and the MPLS enabled switch is monitored for utilization. Because the link between the RFC 1483 bridge and the MPLS enabled switch is the smallest data pipe on the tower, the traffic at this point becomes critical when evaluating tower loading.

LOS LCV FERR OOF FERF AIS P-Bit C-Bit FEBE DLE describes an industry-recognized set of parameters that are monitored to assure they fall within acceptable levels, as with the other parameters described above. The monitored parameters include:
  LOS: Loss of Signal
  LCV: Line Code Violation
  FERR: Framing Bit Error
  OOF: Out of Frame
  FERF: Far End Receive Failure
  AIS: Alarm Indication Signal
  P-Bit: Parity Bit Errors
  C-Bit: C-Parity Bit Errors
  FEBE: Far End Block Errors
  DLE: data Link Errors Detection of errors on any one or more of these parameters indicates errors on the SONET layer of the network. Determining how these errors correlate to other errors on the network provides data that aids in problem identification and resolution.

The ability of the network to carry the services of multiple ISP providers provides flexibility and reliability to end-users. ISP up-time is critical to providing carrier grade service. ISP feeds and services are monitored for quality assurance and for billing purposes. Per-tower statistics are also monitored and trend alarms established to provide tower load-balancing and assure that acceptable utilization is maintained based on pre-agreed bandwidth requirement for ISPs.

The SONET ring configuration itself is monitored to assure highest reliability at the backbone layer. Bi-directional signal strength is monitored for quality assurance. BER (bit error rate) is also monitored at this layer for quality assurance. By way of example, if errors are detected at both the licensed microwave layer and the ADM layer a licensed radio problem is likely. If errors at the SONET layer are detected but not at the radio, cabling may be suspect.

The method of the present invention allows the deployment of a carrier-grade telephony and data communications network over wide geographical areas using wireless systems, providing the redundancy and reliability required to achieve that standard. This configuration may be economically deployed in rural and urban areas and provides an effective alternative to traditional wire-based or optical fiber-based telecommunications networking systems. Thus, the present invention has several advantages over the prior art. Although embodiments of the present invention have been described, various modifications and changes may be made by those skilled in the art without departing from the spirit and scope of the invention.

The invention claimed is:

1. A SONET network infrastructure including at least one non-hardline link configured to have the ability to provide multiuser, multinetwork, and multiservice connectivity over a wide geographic area comprising:
  a combination hardline and non-hardline network backbone connected in a SONET configuration to create a telecommunications network configured to utilize predetermined communications protocols, the backbone comprising a plurality of interconnected transponder nodes arranged in a predetermined topological configuration, each node having at least one SONET add/drop multiplexer configured to communicate with at least one adjacent node and each node having the ability to add and drop communications services to that node;
  a data link layer communicably connected to the backbone through the add-drop multiplexer and forming a switched circuit hierarchy, the data link layer comprising
    at least one switch having at least one permanent virtual circuit, each virtual circuit enabling a discrete communication channel accessible by a bridge, the bridge being configured with at least one connection to the switch;
    at least one of the virtual circuits acting as a master virtual circuit for managing and controlling equipment and communications on the network infrastructure from a central network management console; and
    at least one virtual local area network that maps to the virtual circuit to enable a discrete communication channel that is accessible by at least one end user;
  a wireless layer including at least one access point connected to the data link layer through the bridge, each access point operating on a predetermined frequency and being configured to provide network connectivity to a predetermined geographical area, each access point comprising at least one radio transceiver and antenna for bi-directional communication with a virtual local area network compatible wireless network device;
  a network management console configured for monitoring communications within and between the backbone, the data link layers, and the access points using the master virtual circuit to receive information about communications across the network infrastructure and to allow centralized management and provisioning while maintaining interoperability among the layers, the access points, and the telecommunications network to which the backbone is connected, the console comprising:
    a database to store and manage information pertaining to operation of the network infrastructure; and
    a translation utility to communicate between the database and predetermined network management utilities that are configured to monitor and manage network security and performance.

2. The infrastructure of claim 1 wherein the transponder nodes are microwave transponders.

3. The infrastructure of claim 1 wherein the communications services are time division multiplexing services.

4. The infrastructure of claim 1 wherein the data link layer is a multiprotocol label switched enabled layer.

5. The infrastructure of claim 1 wherein the data link layer is an asynchronous transfer mode layer.

6. The infrastructure of claim 1 wherein the virtual circuit enables a discrete communication channel, the communication channel being an ISP, MAN, WAN or LAN channel.

7. The infrastructure of claim 1 wherein the bridge is a RFC1483 bridge.

8. The infrastructure of claim 1 wherein the wireless layer communicates using an Ethernet protocol.

9. The infrastructure of claim 1 wherein the wireless layer communicates using time division multiplexing.

10. The infrastructure of claim 1 wherein the database is a relational database.

11. The infrastructure of claim 1 wherein the translation utility is a simple network management protocol to structured query language translation utility.

12. The infrastructure of claim 1 wherein the network management console monitors and manages at least one of authentication, filtering authentication, bandwidth monitoring, bandwidth throttling, media access control address authentication, virtual circuit authentication, virtual private networking authentication, and physical plant status and conditions.

13. A network infrastructure including at least one non-hardline link configured to have the ability to provide connectivity over a geographic area comprising:
    a network backbone connected in a predetermined configuration to create a telecommunications network configured to utilize predetermined communications protocols, the backbone comprising a plurality of interconnected transponder nodes arranged in a predetermined topological configuration, each node having at least one add/drop multiplexer configured to communicate with at least one adjacent node and each node having the ability to add and drop communications services to that node;
    a data link layer communicably connected to the backbone through the add-drop multiplexer, the data link layer comprising
        a switch having a permanent virtual circuit that enables a discrete communication channel accessible by a bridge, the bridge being configured with at least one connection to the switch;
        the virtual circuit acting as a master virtual circuit for managing and controlling equipment and communications on the network infrastructure; and
        a virtual local area network that maps to the virtual circuit to enable a discrete communication channel;
    a wireless layer including an access point connected to the data link layer through the bridge, the access point operating on a predetermined frequency and being configured to provide network connectivity to a predetermined geographical area, the access point comprising a radio transceiver for communication with a compatible network device;
    a network management console for monitoring communications within and between the backbone, the data link layer, and the access point using the master virtual circuit, the console comprising:
        a database; and
        a translation utility to communicate between the database and a network management utility.

14. The infrastructure of claim 13 wherein the transponder nodes are microwave transponders.

15. The infrastructure of claim 13 wherein the communications services are time division multiplexing services.

16. The infrastructure of claim 13 wherein the data link layer is a multiprotocol label switched enabled layer.

17. The infrastructure of claim 13 wherein the data link layer is an asynchronous transfer mode layer.

18. The infrastructure of claim 13 wherein the virtual circuit enables a discrete communication channel, the communication channel being an ISP, MAN, WAN or LAN channel.

19. The infrastructure of claim 13 wherein the bridge is a RFC1483 bridge.

20. The infrastructure of claim 13 wherein the wireless layer communicates using an Ethernet protocol.

21. The infrastructure of claim 13 wherein the wireless layer communicates using time division multiplexing.

22. The infrastructure of claim 13 wherein the database is a relational database.

23. The infrastructure of claim 13 wherein the translation utility is a simple network management protocol to structured query language translation utility.

24. The infrastructure of claim 13 wherein the network management console monitors and manages at least one of authentication, filtering authentication, bandwidth monitoring, bandwidth throttling, media access control address authentication, virtual circuit authentication, virtual private networking authentication, and physical plant status and conditions.

25. The infrastructure of claim 13 wherein the network infrastructure is a SONET ring.

26. The infrastructure of claim 13 wherein the data link layer forms a switched circuit hierarchy.

27. The infrastructure of claim 13 wherein the network console receives information about communications across the network infrastructure and allows management and provisioning while maintaining interoperability.

28. A network infrastructure including at least one non-hardline link configured to have the ability to provide connectivity over a geographic area comprising:
    a network backbone connected in a predetermined configuration to create a telecommunications network configured to utilize predetermined communications protocols, the backbone comprising a plurality of interconnected transponder nodes arranged in a predetermined topological configuration, each node having at least one add/drop multiplexer configured to communicate with at least one adjacent node and each node having the ability to add and drop communications services to that node;
    a data link layer communicably connected to the backbone through the add-drop multiplexer, the data link layer comprising
        a switch having a permanent virtual circuit that enables a discrete communication channel accessible by a bridge, the bridge being configured with at least one connection to the switch;
        the virtual circuit acting as a master virtual circuit for managing and controlling equipment and communications on the network infrastructure; and
        a virtual local area network that maps to the virtual circuit to enable a discrete communication channel; and
    a wireless layer including an access point connected to the data link layer through the bridge, the access point operating on a predetermined frequency and being configured to provide network connectivity to a predetermined geographical area, the access point comprising a radio transceiver for communication with a compatible network device.

29. The infrastructure of claim 28 wherein the transponder nodes are microwave transponders.

30. The infrastructure of claim 28 wherein the communications services are time division multiplexing services.

31. The infrastructure of claim 28 wherein the data link layer is a multiprotocol label switched enabled layer.

32. The infrastructure of claim 28 wherein the data link layer is an asynchronous transfer mode layer.

33. The infrastructure of claim 28 wherein the virtual circuit enables a discrete communication channel, the communication channel being an ISP, MAN, WAN or LAN channel.

34. The infrastructure of claim 28 wherein the bridge is a RFC1483 bridge.

35. The infrastructure of claim 28 wherein the wireless layer communicates using an Ethernet protocol.

36. The infrastructure of claim 28 wherein the wireless layer communicates using time division multiplexing.

37. The infrastructure of claim 28 wherein the network infrastructure is a SONET ring.

38. The infrastructure of claim 28 wherein the data link layer forms a switched circuit hierarchy.

39. The infrastructure of claim 28 further comprising a network management console for monitoring communications within and between the backbone, the data link layer, and the access point using the master virtual circuit, the console comprising:
a database; and
a translation utility to communicate between the database and a network management utility.

40. The infrastructure of claim 39 wherein the database is a relational database.

41. The infrastructure of claim 39 wherein the translation utility is a simple network management protocol to structured query language translation utility.

42. The infrastructure of claim 39 wherein the network management console monitors and manages at least one of authentication, filtering authentication, bandwidth monitoring, bandwidth throttling, media access control address authentication, virtual circuit authentication, virtual private networking authentication, and physical plant status and conditions.

43. The infrastructure of claim 39 wherein the network console receives information about communications across the network infrastructure and allows management and provisioning while maintaining interoperability.

* * * * *